US012587891B2

(12) United States Patent (10) Patent No.: US 12,587,891 B2
Paria et al. (45) Date of Patent: Mar. 24, 2026

(54) FRONTHAUL TIMING IMPROVEMENTS

(71) Applicant: QUALCOMM Incorporated, San Diego, CA (US)

(72) Inventors: Niladri Shekhar Paria, Espoo (FI); Jitendra Otwani, Indore (IN)

( * ) Notice: Subject to any disclaimer, the term of this patent is extended or adjusted under 35 U.S.C. 154(b) by 489 days.

(21) Appl. No.: 18/149,428

(22) Filed: Jan. 3, 2023

(65) Prior Publication Data

US 2024/0224107 A1 Jul. 4, 2024

(51) Int. Cl.
*H04W 28/02* (2009.01)
*H04W 24/10* (2009.01)
*H04W 72/12* (2023.01)

(52) U.S. Cl.
CPC ....... *H04W 28/0231* (2013.01); *H04W 24/10* (2013.01); *H04W 72/1221* (2013.01)

(58) Field of Classification Search
CPC ............. H04W 28/0231; H04W 24/10; H04W 72/1221
See application file for complete search history.

(56) References Cited

U.S. PATENT DOCUMENTS

| | | | |
|---|---|---|---|
| 2023/0208559 A1* | 6/2023 | Rama Chandran ... | H04L 1/1607 370/328 |
| 2024/0306017 A1* | 9/2024 | Hishi ..................... | H04W 24/04 |
| 2024/0389018 A1* | 11/2024 | Sung ..................... | H04W 88/08 |

OTHER PUBLICATIONS

ETSI TS 103859 V7.0.20-RAN Fronthaul Control, User and Synchronization Plane Specification (Year: 2022).*

* cited by examiner

*Primary Examiner* — Jung H Park

(57) ABSTRACT

Certain aspects of the present disclosure provide techniques for improving fronthaul timing. An example method, performed by a first network entity, includes receiving user plane (U-Plane) messages from a second network entity, maintaining at least a first counter that indicates a number of U-Plane messages for which the first network entity has not received an associated control plane (C-Plane) message, and transmitting, to the second network entity, a message indicating the counter.

26 Claims, 16 Drawing Sheets

500 ⌐

502

Fronthaul Interface

C-Plane ⟩✗

U-Plane ⟩

506

U-Plane Received
without C-Plane

DU

504

RU

M-Plane Interface

Stats Request ⟩

⟨ Stats Response

Time

700

502

Fronthaul Interface

C-Plane

U-Plane

706

U-plane Can't be Processed
at RU as C-Plane is not
Received. RU Will Update
Counter (*RX_U_Without_C*)

708

Adjusting
C-Plane
Message
Transmission
Timing if
Counter
Exceeds a
Threshold

DU

M-Plane Interface

Stats Request

Stats Response (*RX_U_Without_C*)

RU

504

Time

1200

A method for wireless communications at a first network entity

Receive U-plane messages from a second network entity    1405

Maintain at least a first counter that indicates a number of U-plane messages for which the first network entity has not received an associated C-plane message    1410

Transmit, to the second network entity, a message indicating the counter    1410

1400

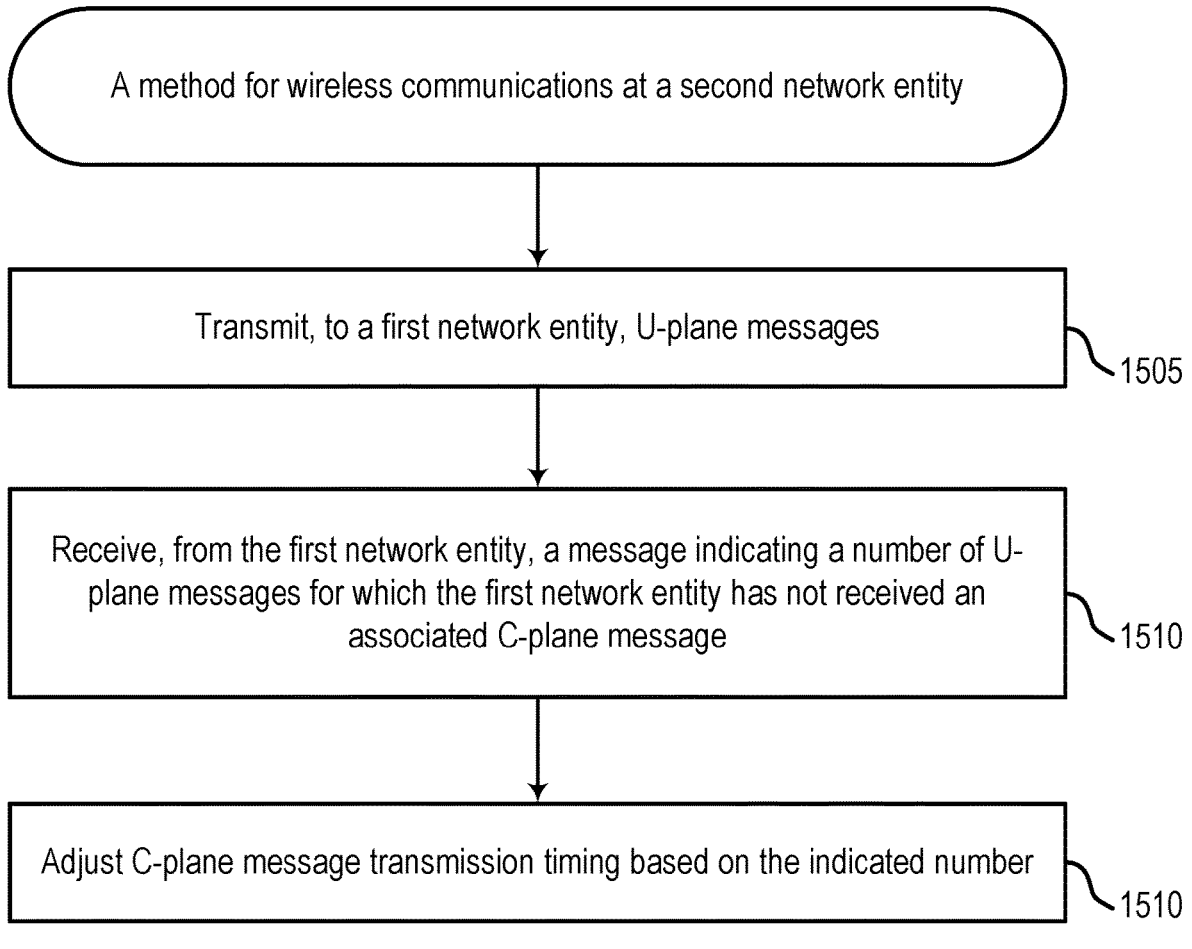

A method for wireless communications at a second network entity

Transmit, to a first network entity, U-plane messages

1505

Receive, from the first network entity, a message indicating a number of U-plane messages for which the first network entity has not received an associated C-plane message

1510

Adjust C-plane message transmission timing based on the indicated number

Network Interface

Transceiver

1602

Processing System

1636

1604

1620

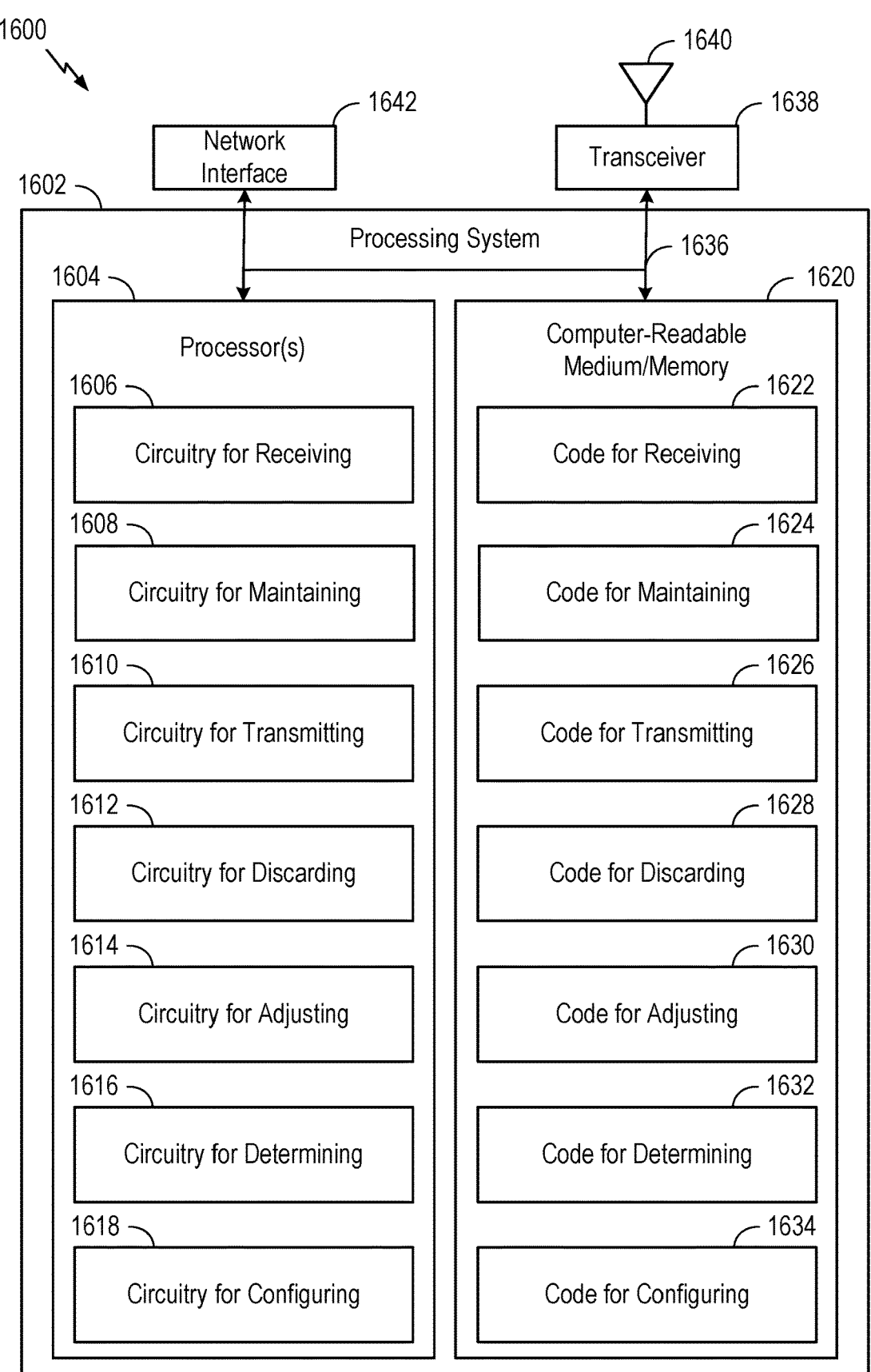

Processor(s)

Computer-Readable Medium/Memory

1606

1622

Circuitry for Receiving

Code for Receiving

1608

1624

Circuitry for Maintaining

Code for Maintaining

1610

1626

Circuitry for Transmitting

Code for Transmitting

1612

1628

Circuitry for Discarding

Code for Discarding

1614

1630

Circuitry for Adjusting

Code for Adjusting

1616

1632

Circuitry for Determining

Code for Determining

1618

1634

Circuitry for Configuring

Code for Configuring

*FIG. 16*

FRONTHAUL TIMING IMPROVEMENTS

BACKGROUND

Field of the Disclosure

Aspects of the present disclosure relate to wireless communications, and more particularly, to techniques for improving performance of a fronthaul link.

Description of Related Art

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users.

Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method for wireless communications at a first network entity. The method includes receiving user plane (U-Plane) messages from a second network entity; maintaining at least a first counter that indicates a number of U-Plane messages for which the first network entity has not received an associated control plane C-Plane message; and transmitting, to the second network entity, a message indicating the counter.

Another aspect provides a method for wireless communications at a second network entity. The method includes transmitting, to a first network entity, U-Plane messages; receiving, from the first network entity, a message indicating a number of U-Plane messages for which the first network entity has not received an associated C-Plane message; and adjusting C-Plane message transmission timing based on the indicated number.

Other aspects provide: an apparatus operable, configured, or otherwise adapted to perform any one or more of the aforementioned methods and/or those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and/or an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

FIG. 15 depicts a method for wireless communications.

FIG. 16 depicts aspects of an example communications device.

DETAILED DESCRIPTION

Figure 1:
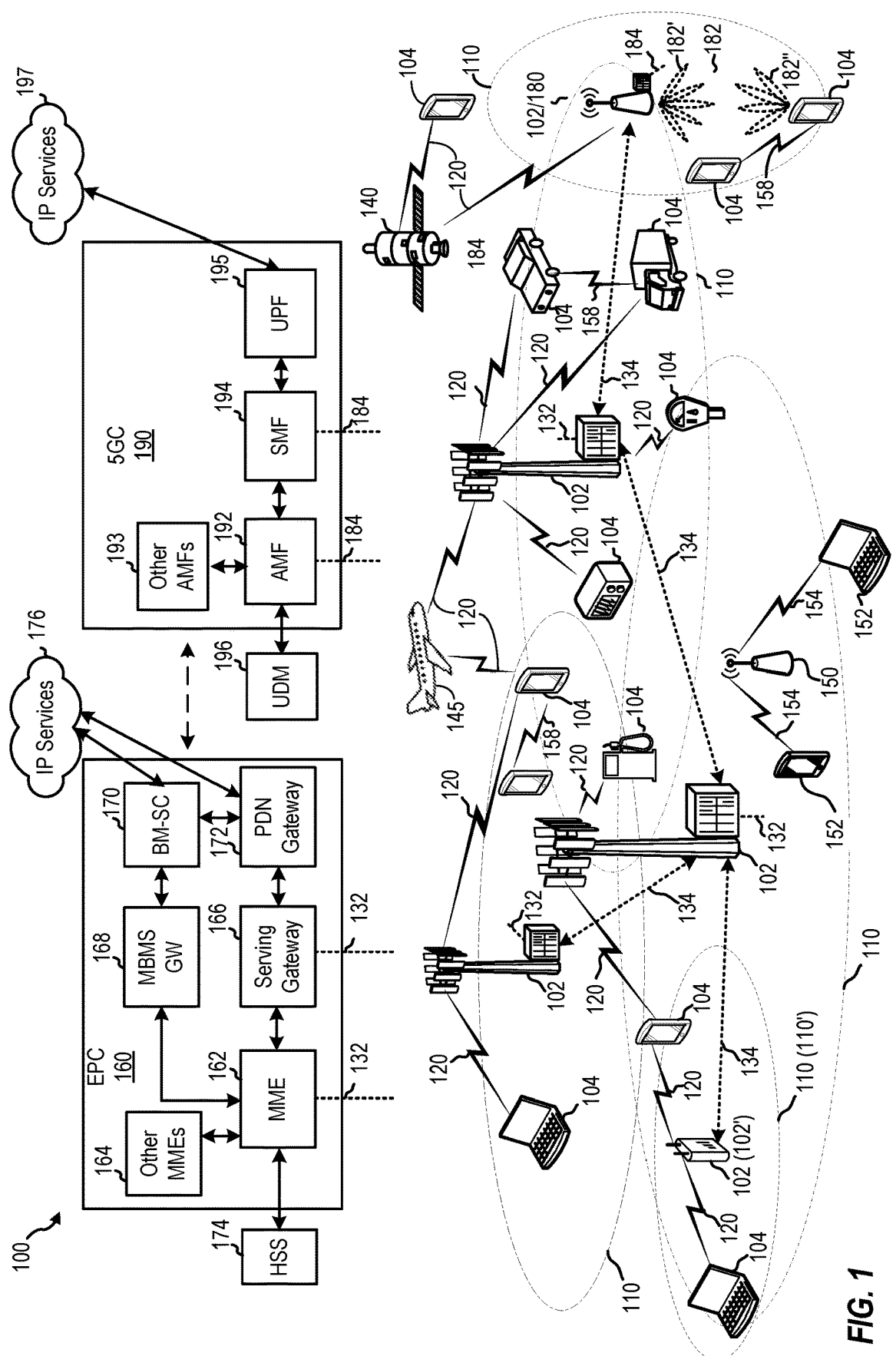
FIG. 1 depicts an example wireless communications network.

Aspects of the present disclosure provide apparatuses, methods, processing systems, and computer-readable mediums for improving fronthaul timing.

Some wireless networks employ disaggregated radio access network (RAN) architectures, in which a base station may include components that are located at various physical locations. In such architectures, different types of functionality used to serve a user equipment (UE) may be split between the components (network entities), including centralized units (CUs), distributed units (DUs), and radio units (RUs). CUs may communicate with a core network via a backhaul link and with one or more DUs via a midhaul link.

A DU may communicate with one or more RUs via a fronthaul link. Control plane (C-Plane) messages, from a DU, may be expected to reach an RU before an associated user plane (U-Plane) message arrives. Control plane messages generally define scheduling and coordination required for data transfer via the U-Plane messages, such as beamforming, and the like. Tight coupling or mapping between C-Plane messages and corresponding U-Plane messages may be expected.

Unfortunately, in-sequence delivery of C-Plane and U-Plane messages may not be guaranteed (e.g., when using Ethernet communication protocols). As a result, in some cases, a U-Plane message may be received outside of an expected timing window for reception of its corresponding control information (e.g., C-Plane message). In such cases, an RU may selectively process the U-Plane messages for which the control information is available, while ignoring the remaining U-Plane messages (for which the control information is not available). The DU may be unaware of this behaviour, since the RU autonomously makes the decision to ignore U-Plane messages for which the control information is not available. Hence, the DU may not correct the transmission timing of C-Plane and U-Plane messages.

Aspects of the present disclosure, however, provide techniques allowing an RU to signal a DU information indicating a number of U-Plane messages have been received without corresponding C-Plane messages. For example, the RU may maintain a separate key performance indicator (KPI) counter. The RU may signal the counter to the DU (e.g., when it exceeds a configurable threshold). Based on the counter, the DU may adjust C-Plane transmission timing, which may result in fewer dropped U-Plane messages and better overall system performance.

The counter may represent the number of inbound user plane messages which were detected to have arrived within their designated receive window time but without receiving corresponding control plane message. This counter may increment whenever a message is dropped due to unavailability of control information. As a result, use of the counter proposed herein may result in a DU taking corrective action (e.g., adjusting C-Plane transmission timing) sooner, which may result in improved performance and user experience.

Introduction to Wireless Communications Networks

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and aircraft 145, which may include network entities on-board (e.g., one or more BSs) capable of communicating with other network elements (e.g., terrestrial BSs) and user equipments.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IOT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. Each of BSs 102 may provide communications coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
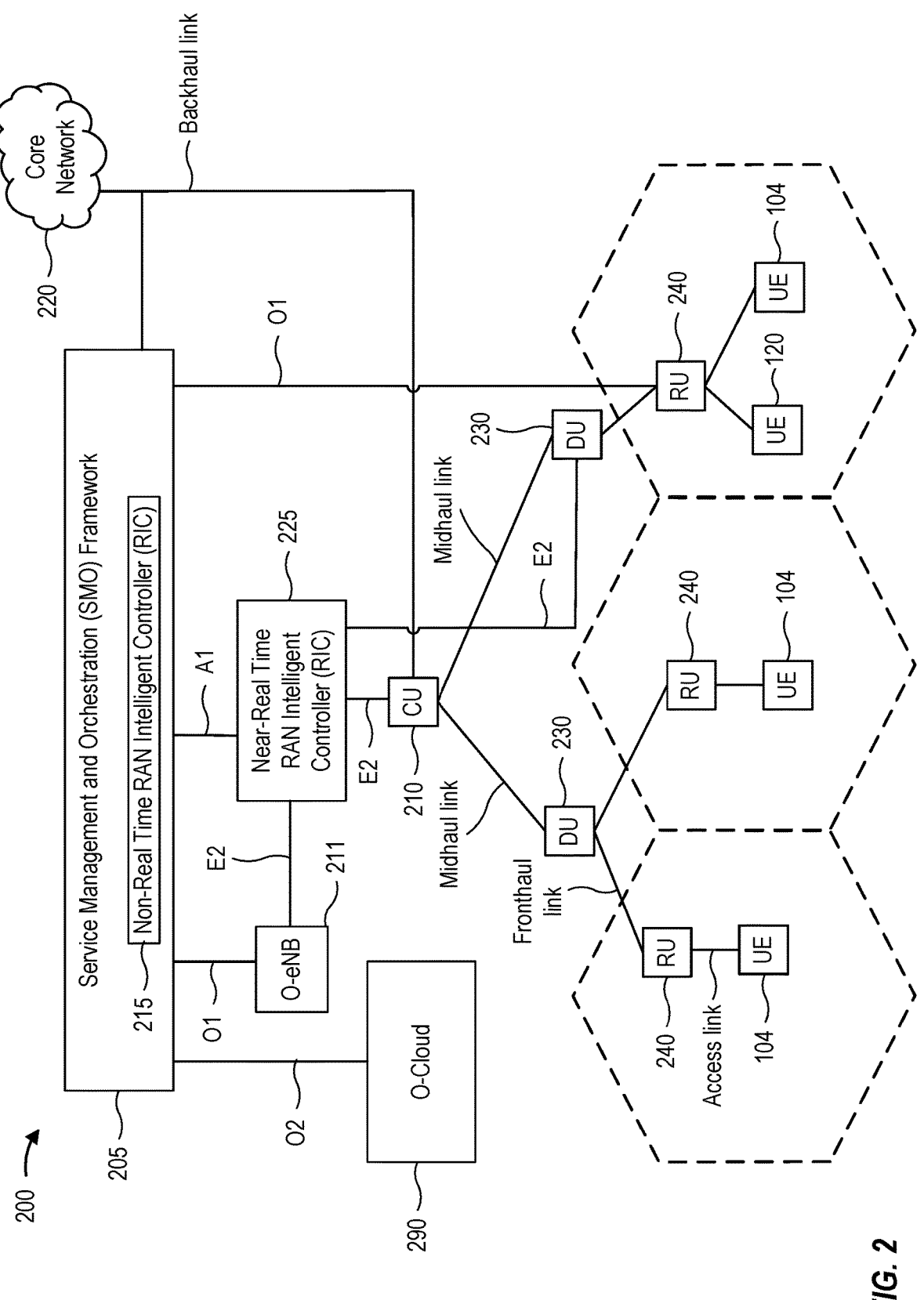
FIG. 2 depicts an example disaggregated base station architecture.

While BSs 102 are depicted in various aspects as unitary communications devices, BSs 102 may be implemented in various configurations. For example, one or more components of a base station may be disaggregated, including a central unit (CU), one or more distributed units (DUs), one or more radio units (RUS), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 410 MHz-7125 MHz, which is often referred to (interchangeably) as "Sub-6 GHz". Similarly, 3GPP currently defines Frequency Range 2 (FR2) as including 24,250 MHz-52,600 MHz, which is sometimes referred to (interchangeably) as a "millimeter wave" ("mmW" or "mmWave"). A base station configured to communicate using mmWave/near mmWave radio frequency bands (e.g., a mmWave base station such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QOS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, a component of a base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUS 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3<sup>rd</sup> Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUS 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
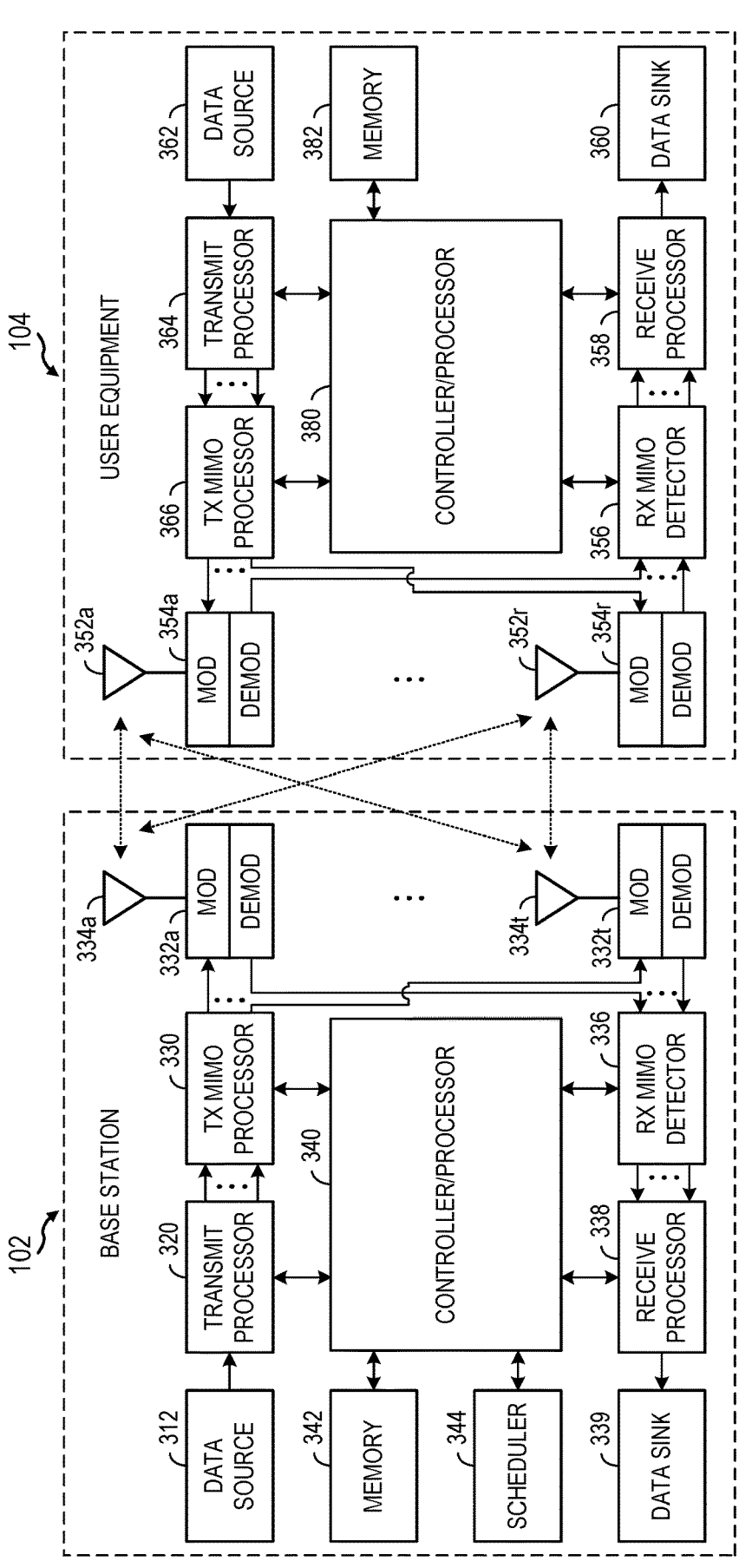
FIG. 3 depicts aspects of an example base station and an example user equipment.

FIG. 3 depicts aspects of an example BS 102 and a UE 104.

Generally, BS 102 includes various processors (e.g., 320, 330, 338, and 340), antennas 334a-t (collectively 334), transceivers 332a-t (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, and 380), antennas 352a-r (collectively 352), transceivers 354a-r (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332a-332t. Each modulator in transceivers 332a-332t may process a respective output symbol stream to obtain an output sample stream. Each modulator may further process (e.g., convert to analog, amplify, filter, and upconvert) the output sample stream to obtain a downlink signal. Downlink signals from the modulators in transceivers 332a-332t may be transmitted via the antennas 334a-334t, respectively.

In order to receive the downlink transmission, UE 104 includes antennas 352a-352r that may receive the downlink signals from the BS 102 and may provide received signals to the demodulators (DEMODs) in transceivers 354a-354r, respectively. Each demodulator in transceivers 354a-354r may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354a-354r, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354a-354r (e.g., for SC-FDM), and transmitted to BS 102.

At BS 102, the uplink signals from UE 104 may be received by antennas 334a-t, processed by the demodulators in transceivers 332a-332t, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332a-t, antenna 334a-t, and/or other aspects described herein. Similarly, "receiving" may refer to various mechanisms of obtaining data, such as obtaining data from antennas 334a-t, transceivers 332a-t, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354a-t, antenna 352a-t, and/or other aspects described herein. Similarly, "receiving" may refer to various mechanisms of obtaining data, such as obtaining data from antennas 352a-t, transceivers 354a-t, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communications network, such as wireless communications network 100 of FIG. 1.

Figures 4A, 4B, 4C, 4D:
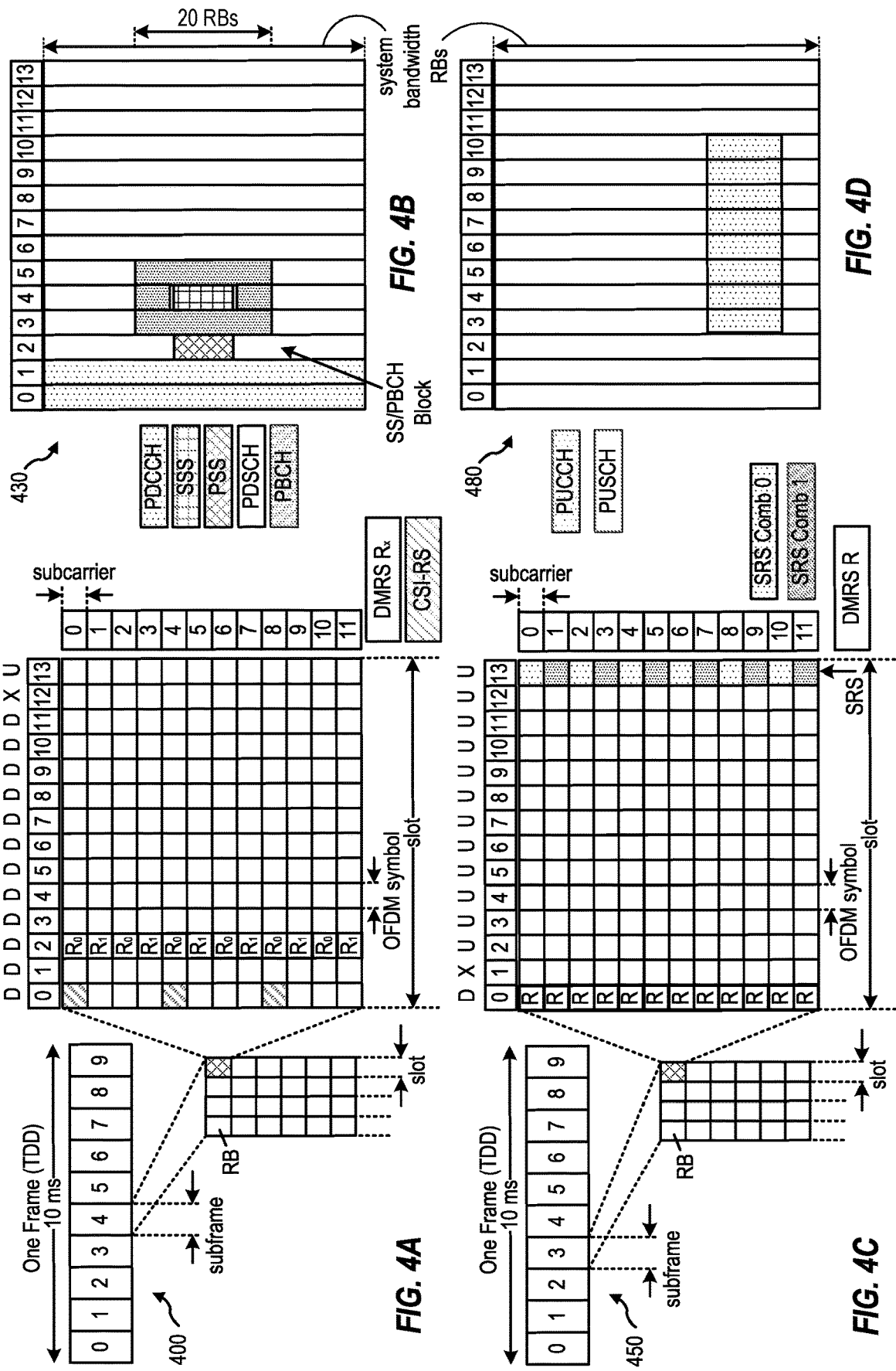
FIGS. 4A, 4B, 4C, and 4D depict various example aspects of data structures for a wireless communications network.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where Dis DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies (u) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and 2u slots/subframe. The subcarrier spacing and symbol length/duration are a function of the numerology. The subcarrier spacing may be equal to $24\times15$ kHz, where u is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 4A, 4B, 4C, and 4D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Aspects Related to Fronthaul Timing Improvements

As noted above, control plane (C-Plane) messages, from a DU, may be expected to reach an RU before an associated user plane (U-Plane) message arrives. Control plane messages generally define scheduling and coordination required for data transfer via the U-Plane messages, such as beamforming, and the like. Tight coupling or mapping between C-Plane messages and corresponding U-Plane messages may be expected. Unfortunately, in-sequence delivery of C-Plane and U-Plane messages may not be guaranteed (e.g., when using Ethernet communication protocols).

Figure 5:
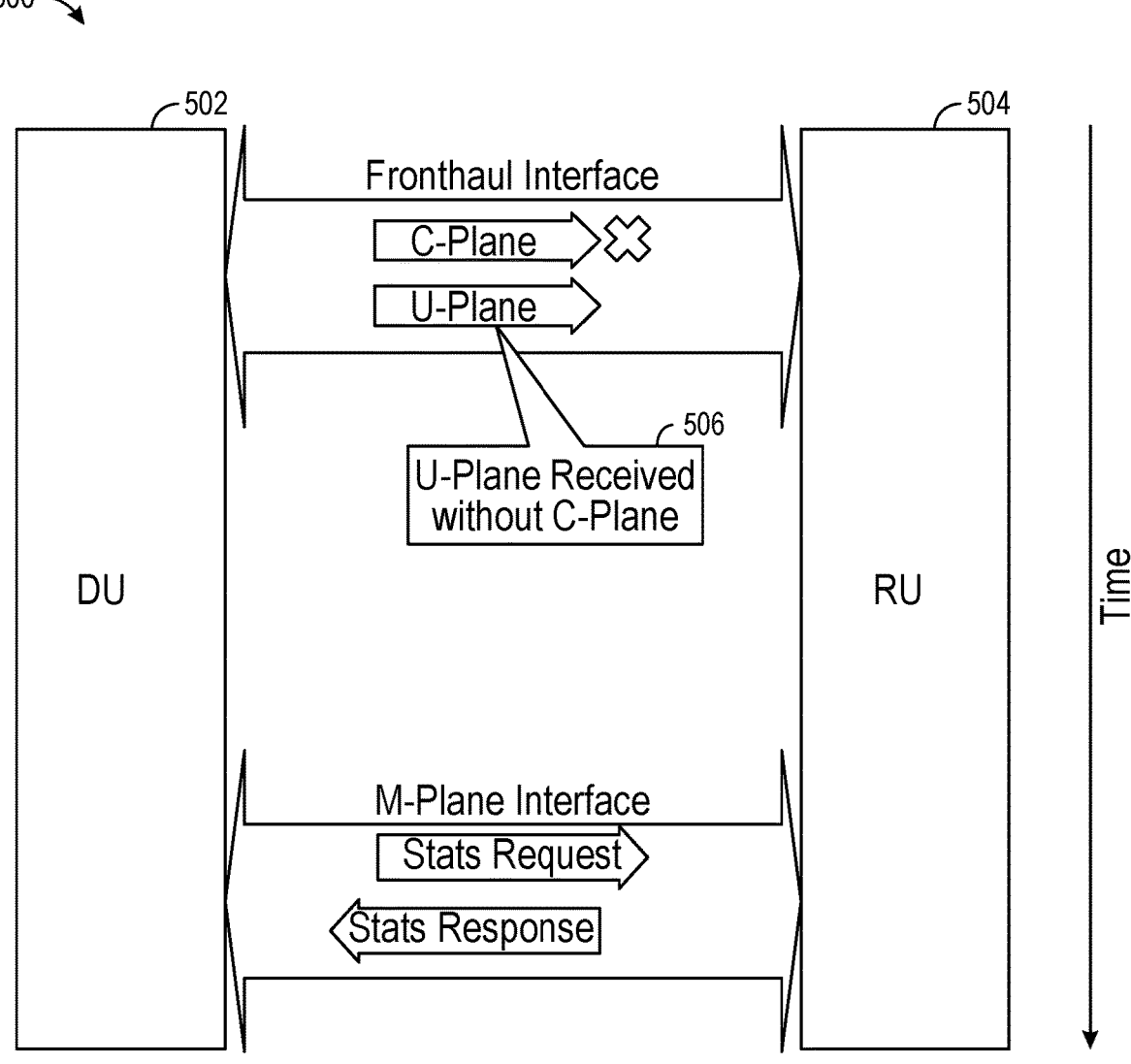
FIG. 5 depicts an example diagram illustrating communications on a fronthaul link between a distributed unit (DU) and a radio unit (RU).

As a result, as illustrated in FIG. 5, a U-Plane message may be received without an associated C-Plane message. For example, the U-Plane message may be received outside of an expected U-Plane reception timing window and/or the U-Plane message could be received within the expected U-Plane reception window, but without receiving its corresponding C-Plane message (within its expected C-Plane reception window).

Figure 6:
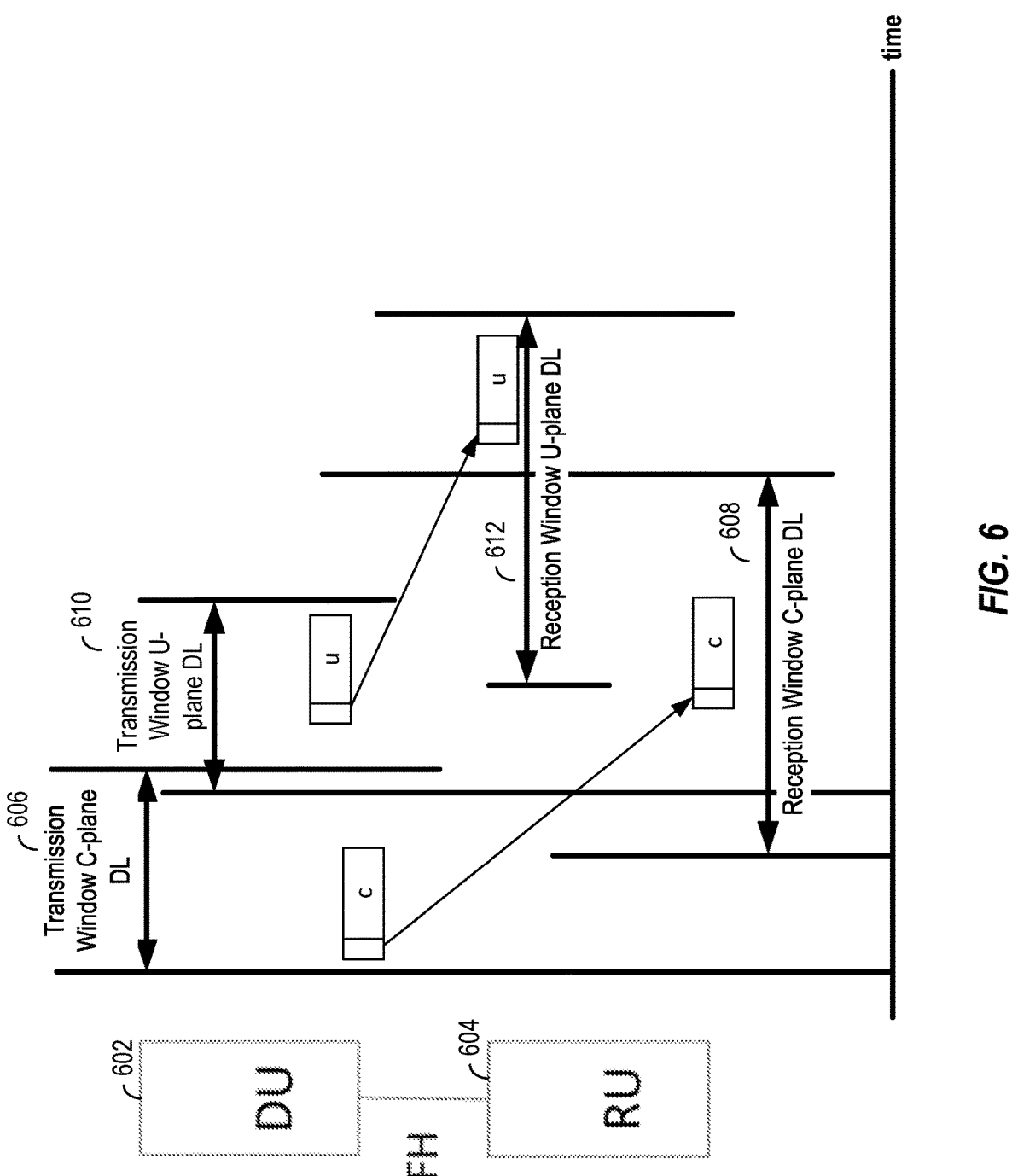
FIG. 6 depicts an example timing diagram for communications on a fronthaul link.

FIG. 6 illustrates example transmission and reception timing windows for C-Plane and U-Plane messages sent from a DU 602 to an RU 604, via a fronthaul (FH) link. As illustrated, the DU transmits a C-Plane message within a C-Plane transmission timing window 606. Ideally, the RU receives the C-Plane message within a C-Plane reception window 608. The DU then transmits a U-Plane message within a U-Plane transmission timing window 610. Ideally, the RU receives the U-Plane message within a U-Plane reception window 612 and processes the U-Plane message in accordance with information contained in the corresponding C-Plane message.

As noted above, however, the RU may receive a U-Plane message without having received its corresponding C-Plane message (within the C-Plane reception window). In such cases, an RU may selectively process the U-Plane messages for which the control information is available, while ignoring the remaining U-Plane messages (for which the control information is not available). The DU may be unaware of this behaviour, since the RU autonomously makes the decision to ignore U-Plane messages for which the control information is not available. Hence, the DU may not correct the transmission timing of C-Plane and U-Plane messages.

Aspects of the present disclosure, however, provide techniques that allow an RU to maintain a separate counter for U-Plane messages received without having received a corresponding C-Plane message. This counter provides awareness to the DU of dropped U-Plane messages and may be used at the DU to trigger corrections/adjustments of the C-Plane transmission timings. The techniques described herein may be used, for example, when a DU and RU belong to a same original equipment manufacturer (OEM) and may, thus, be capable of utilizing the counter. In some cases, the counter may be used as a key performance indicator (KPI).

Figure 7:
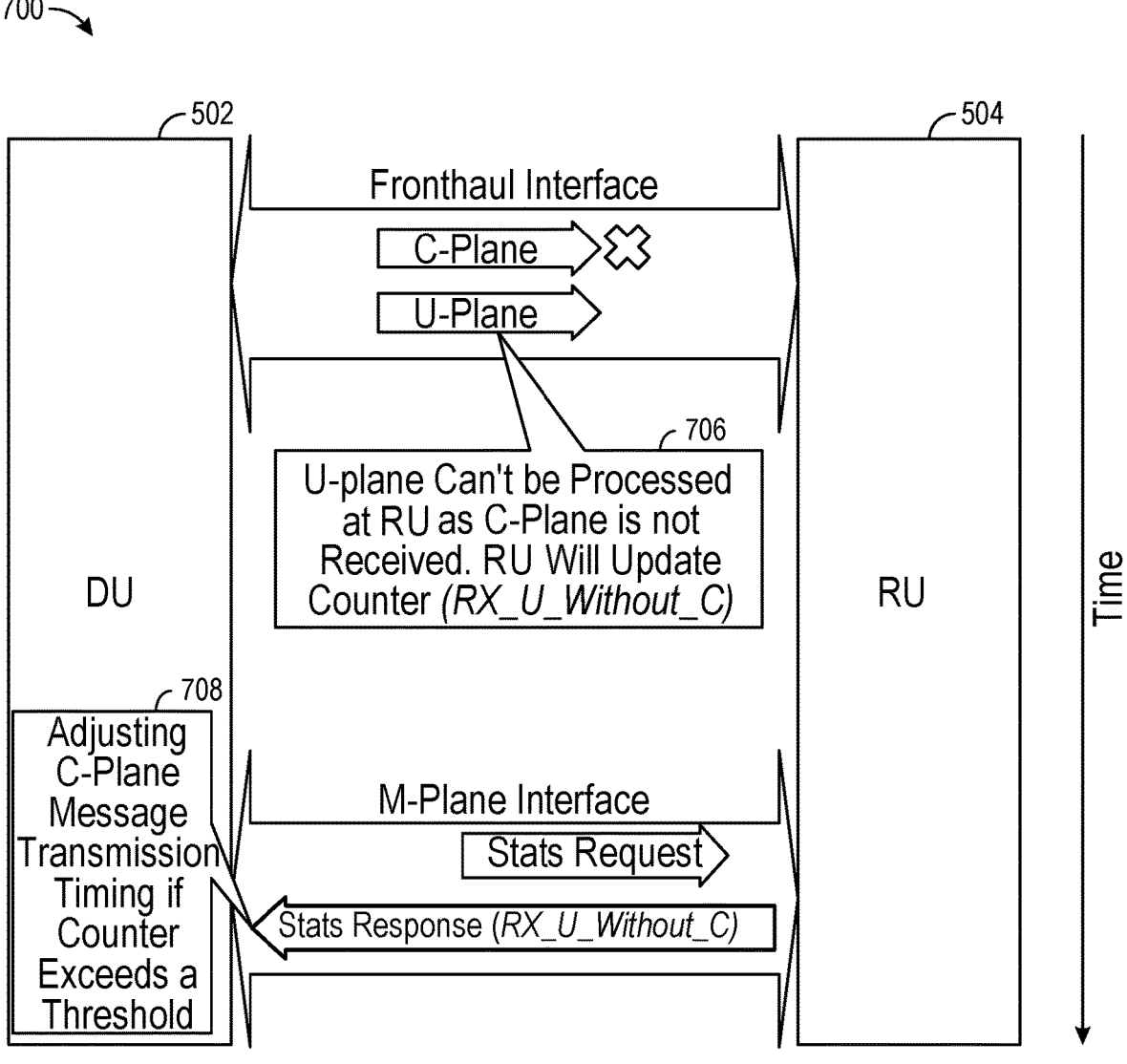
FIG. 7 depicts an example diagram illustrating communications on a fronthaul link between a DU and an RU, in accordance with certain aspects of the present disclosure.

As illustrated in the call flow diagram 700 of FIG. 7, such a counter may be referred to herein, and labeled in the drawings, as RX_U_WITHOUT_C. In some cases, the counter may be defined as the number of inbound U-Plane messages which were detected to have arrived within their designated receive window time but without having received a corresponding C-Plane message (within its reception window).

In other words, as shown at 706, this counter may increment whenever a message is dropped due to unavailability of control information. The DU may use the counter at the DU to trigger corrections/adjustments of the C-Plane transmission timings. For example, as shown at 708, the DU may adjust C-Plane transmission timing if the counter exceeds a threshold value.

As illustrated, the DU may obtain the RX_U_WITHOUT_C counter value as part of a statistics request and response exchange via a management plane (M-Plane) interface. A typical statistics request and response exchange (e.g., shown in FIG. 5) may involve counters that indicate how many U-Plane packets were received early (e.g., before the expected U-Plane reception window) or late (e.g., after the expected U-Plane reception window).

In contrast to the RX_U_WITHOUT_C counter proposed herein, the conventional early and late counters fail to increment when a U-Plane message is received within its expected reception window, but without having received corresponding control information. Further, the RX_U_WITHOUT_C counter may account for the fact that a single C-Plane message may have multiple corresponding U-Plane messages (e.g., the counter may increment for each of the U-Plane messages). Thus, a value of the RX_U_WITHOUT_C counter may reach a threshold more rapidly than the conventional early/late counters. As a result, use of the RX_U_WITHOUT_C counter proposed herein may result in a DU taking corrective action sooner, which may result in improved performance and user experience.

Figure 8:
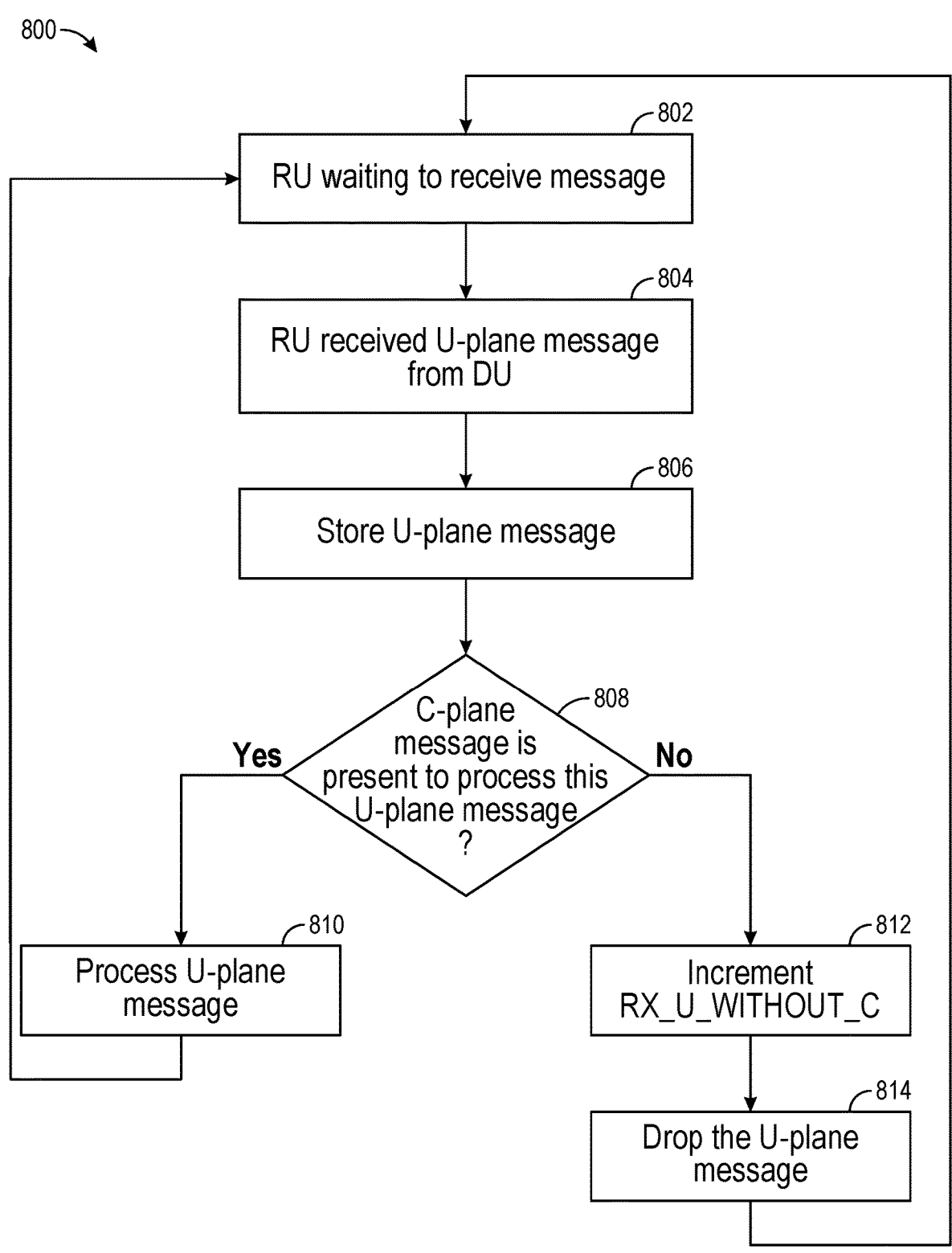
FIG. 8 depicts an example flow diagram for processing communications on a fronthaul link between a DU and an RU, in accordance with certain aspects of the present disclosure.

Use of the RX_U_WITHOUT_C counter proposed herein may be understood with reference to the flow diagram 800 illustrated in FIG. 8. The flow diagram illustrates operations from the RU-perspective.

As illustrated, at 802, the RU may be in a wait state to receive a message from the DU. Upon reception of a U-Plane message, at 804, the RU may store the U-Plane message, at 806.

Upon reception of the U-Plane message, the RU may attempt to locate (triangulate) its corresponding C-Plane message. If the RU finds the corresponding C-Plane message, as determined at 808, the RU has the control information for the U-Plane message. Thus, the RU may process the U-Plane message using the control information, at 810, and return (to 802) to wait for new incoming messages.

If a corresponding C-Plane message is not found, the RU may increment the counter RX_U_WITHOUT_C, at 812. Because the RU does not have the corresponding control information to process the U-Plane message, it may discard the U-Plane message, at 814, and return (to 802) to wait for new incoming messages.

The RU may discard U-Plane messages without any processing in this manner, for example, if the corresponding C-Plane messages is not received within a stipulated reception window. For each discarded U-Plane message, the RX_U_WITHOUT_C counter proposed herein may be incremented, as noted above.

Figure 9:
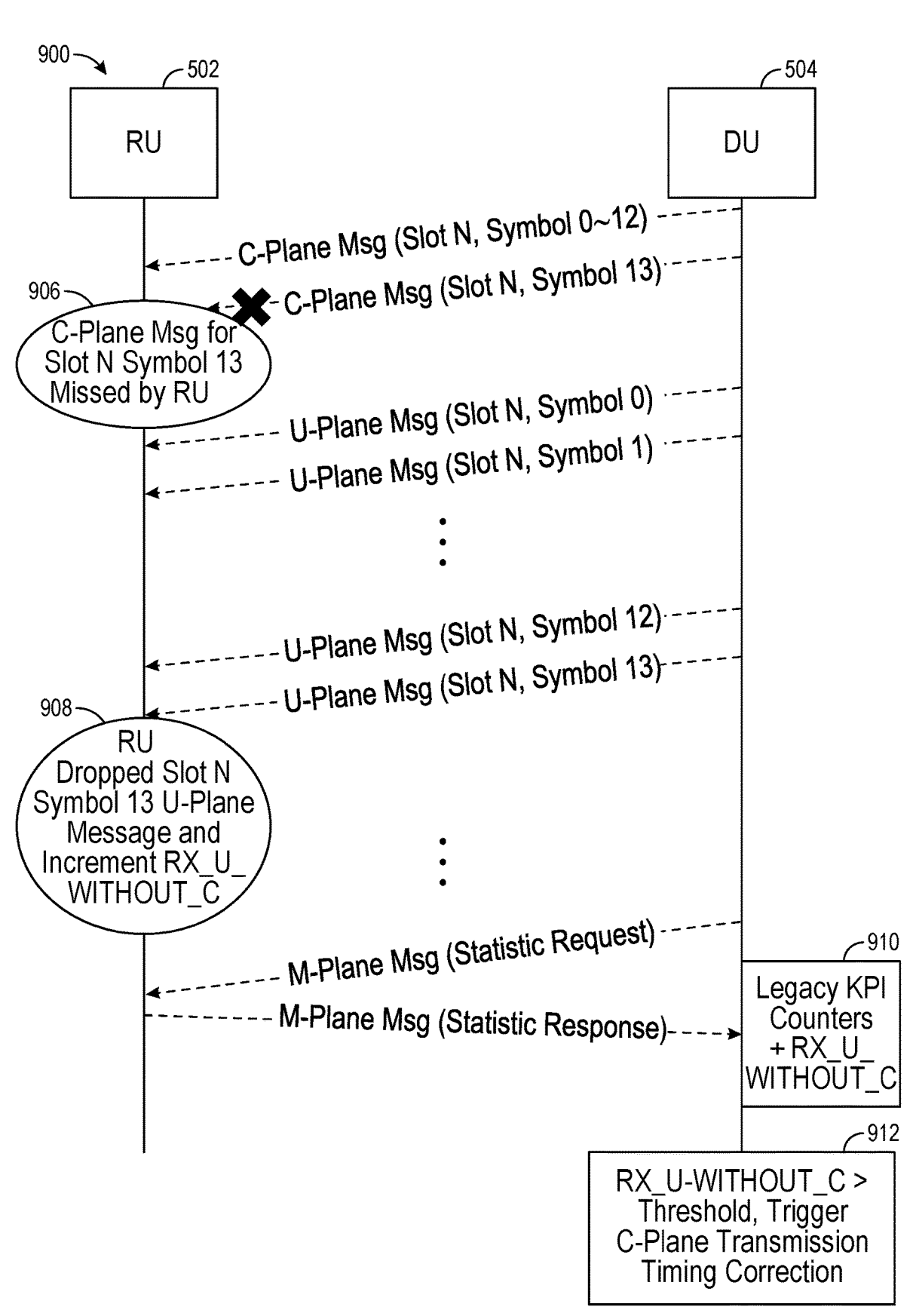
FIG. 9 depicts an example call flow diagram, in accordance with certain aspects of the present disclosure.

The call flow diagram 900 illustrated in FIG. 9 illustrates the use and impact of the type of counter proposed herein.

In the illustrated example, a C-Plane message may be received successfully by the RU for corresponding U-Plane messages to be transmitted in slot N, symbols 0 through 12. In other words, this C-Plane message may include control information for 13 U-Plane messages.

However, as illustrated at 906, a C-Plane message corresponding to a U-Plane message to be transmitted in slot N, symbol 13, may not be successfully received (e.g., within its expected C-Plane transmission time window).

As shown, therefore, the U-Plane messages corresponding to the successfully received C-Plane message (e.g., transmitted in slot N, symbols 0 through 12) may be processed. However, the U-Plane message corresponding to the C-Plane message that was not successfully received (e.g., transmitted in slot N, symbol 13) may be dropped/discarded, as shown at 908.

As noted above, for each discarded U-Plane message, the RX_U_WITHOUT_C counter proposed herein may be incremented (as shown at 908). As shown, the DU may transmit an M-Plane message including a statistics request. In response, the RU may provide an M-Plane message including a statistics response. In some cases, the statistics response may include the conventional/legacy early and late counters described above, as well as the RX_U_WITHOUT_C counter proposed herein, as shown at 910.

In response to determining that the RX_U_WITHOUT_C counter has exceeded a threshold value, the DU may take corrective action (e.g., perform a transmission timing correction procedure). In some cases, the DU may compare a counter value (e.g., received in a statistics response) to the threshold value. In other cases, the RU may be configured with the threshold value and may proactively transmit an indication (e.g., without waiting for a statistics request) when the counter exceeds the threshold value. In such cases, the RU could include the actual value of the counter or could simply include an indication the counter value has exceeded the threshold.

Figure 10:
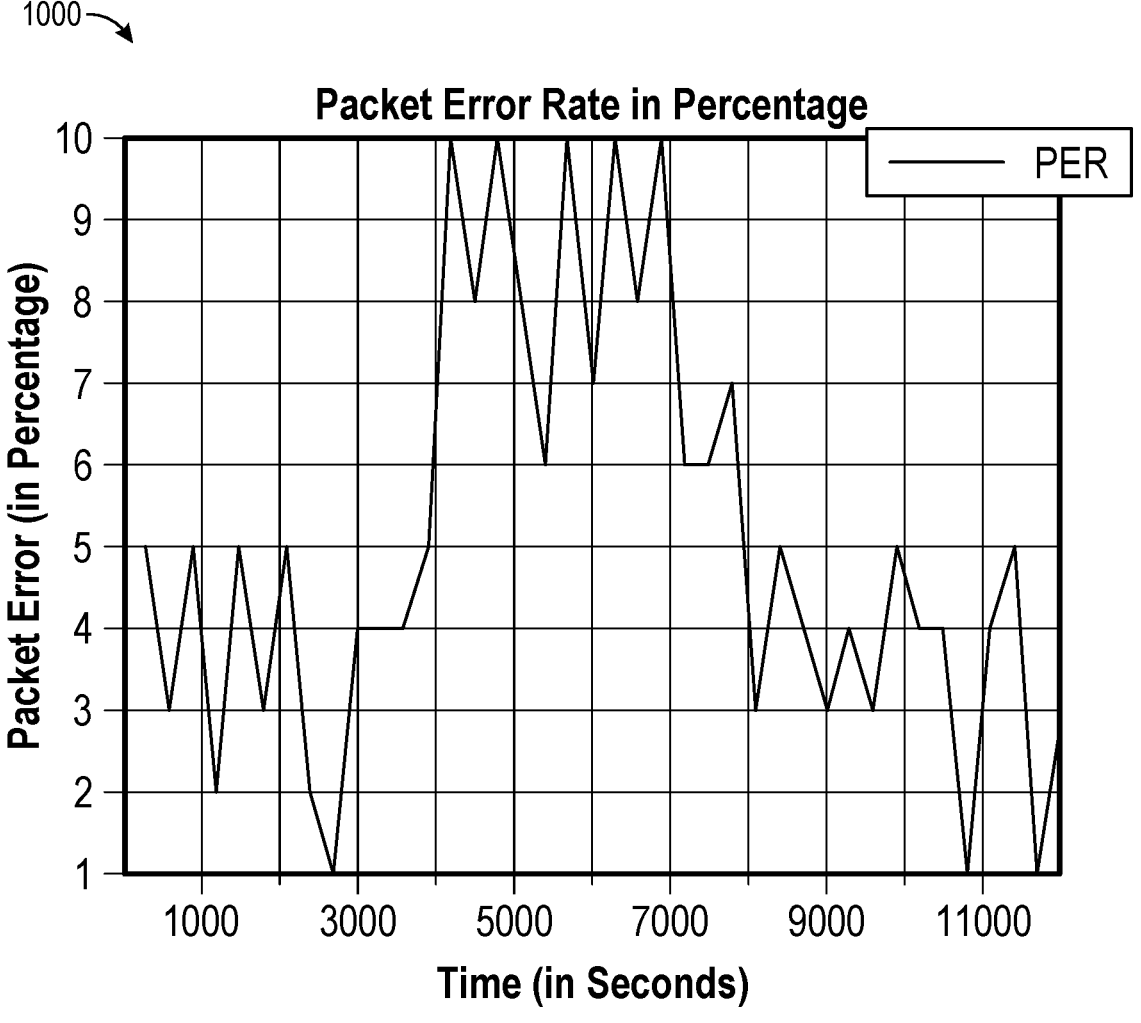
FIG. 10 depicts an example graph illustrating a simulated packet error rate (PER) percentage over time.

FIG. 10 depicts an example graph 1000 illustrating a simulated packet error rate (PER) percentage over time. The PER refers to a number of error packets divided by a total number of received packets. Erroneous packets are marked as cumulative C-Plane and U-Plane messages that are dropped for any reason (e.g., packets received late, received early, received without control information, etc.).

In the example illustrated in FIG. 10, the PER may reach as high as 10%. Of the packets dropped at the RU, a relatively high percentage (e.g., 13~14%) may correspond to U-Plane messages received without having received a corresponding C-Plane message.

Figure 11:
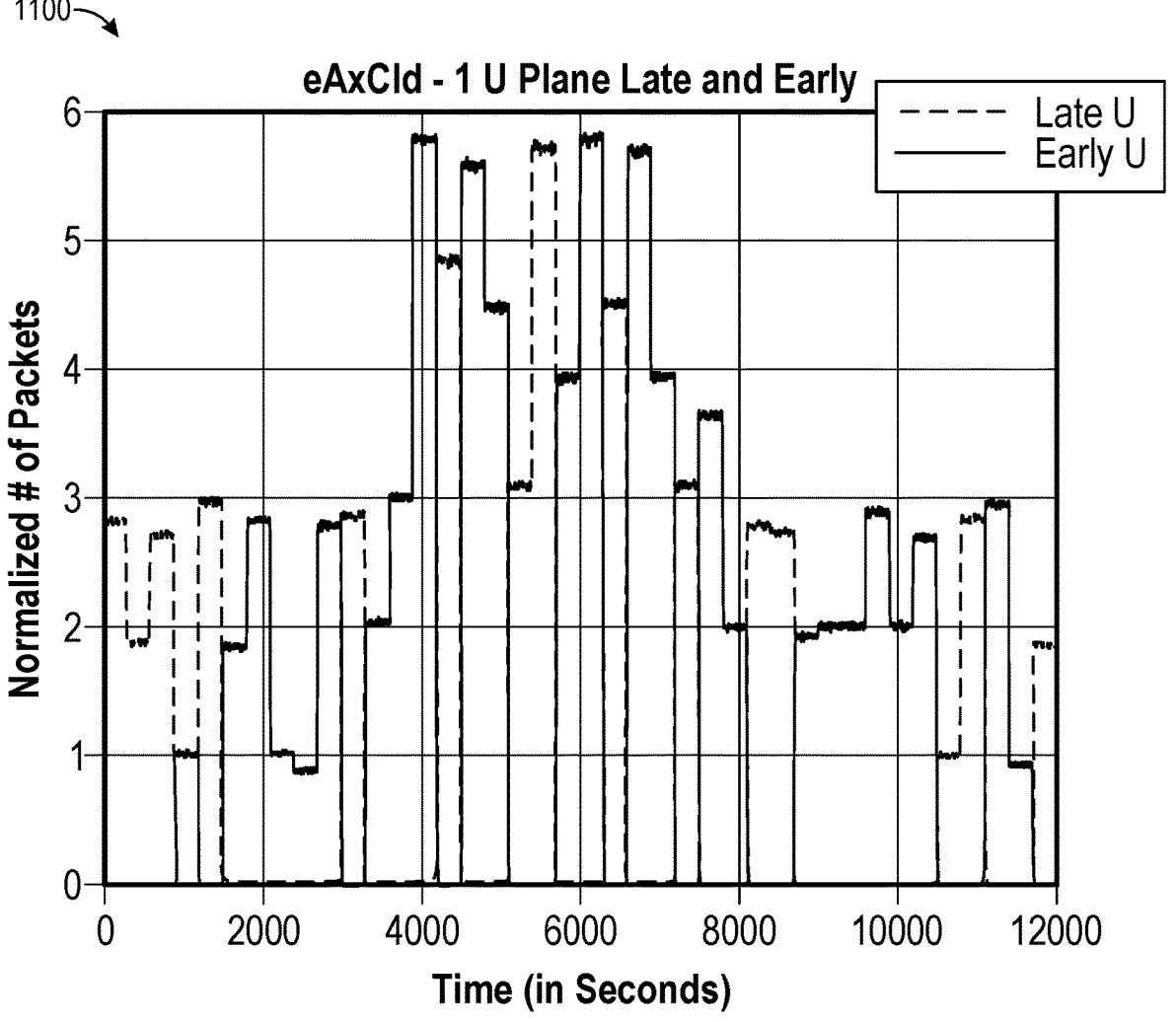
FIG. 11 depicts an example graph illustrating user plane (U-Plane) packets received outside of a reception window, over time.

FIG. 11 depicts an example graph 1100 illustrating normalized values of the conventional early and late counters over time. As noted above, in conventional techniques, RU may maintain late and early counters indicating a number of U-Plane packets received late or early (respectively) relative to a reception window. For example, the Late U counter illustrated in FIG. 11 may indicate how many U-Plane packets were received late (e.g., after the expected U-Plane reception window), whereas the Early U counter illustrated in FIG. 11 may indicate how many U-Plane packets were received early (e.g., before the expected U-Plane reception window).

As noted above, in contrast to the RX_U_WITHOUT_C counter proposed herein, the conventional early and late counters fail to increment when a U-Plane message is received within its expected reception window (as it is not received early or late), but without having received corresponding control information. Further, the RX_U_WITH-OUT_C counter may account for the fact that a single C-Plane message may have multiple corresponding U-Plane messages. For example, if the RU of FIG. 9 had missed the first C-Plane message (for the U-Plane messages transmitted at Slot N, Symbols 0-12), the RU would have incremented the RX_U_WITHOUT_C counter for each of the 13 U-Plane messages, which would have been dropped. Thus, a value of the RX_U_WITHOUT_C counter may reach a threshold more rapidly than the conventional early/late counters. As a result, use of the RX_U_WITHOUT_C counter proposed herein may result in a DU taking correc-tive action sooner, which may result in improved perfor-mance and user experience.

Figure 12:
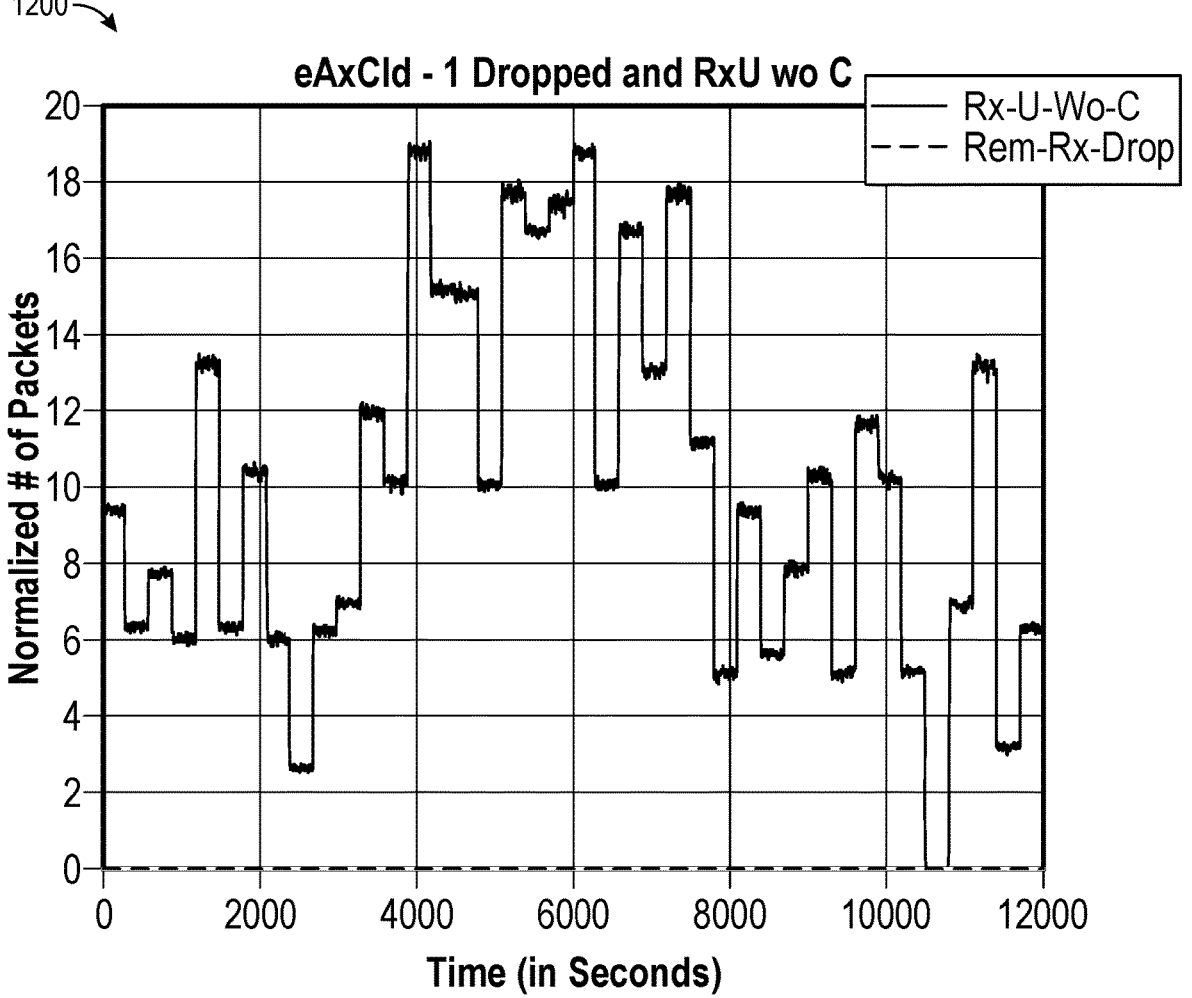
FIG. 12 depicts an example graph illustrating the value of a counter proposed herein over time, in accordance with certain aspects of the present disclosure.

FIG. 12 depicts an example graph illustrating the value of the counter proposed herein over time, in accordance with certain aspects of the present disclosure. As noted above, RU may maintain separate statistics in the form of a counter (RX_U_WITHOUT_C) and may increment its value when-ever a U-Plane message is discarded due to the absence of required control information (e.g., the corresponding C-Plane message has not been received within the C-Plane reception window). According to certain aspects, the RU may provide these statistics along with conventional/legacy statistics to DU when requested.

The graph 1200 of FIG. 12 illustrates a normalized value of the proposed RX_U_WITHOUT_C counter over time and shows how the RX_U_WITHOUT_C counter may be incremented more rapidly than the conventional early and late counters. As shown, the normalized value of the RX_U_WITHOUT_C counter exceeds the sum of the legacy early and late counters described with reference to FIG. 11. For example, at 4000 seconds, the counter proposed herein reaches a value of 19 percent whereas the sum of the early counter and the late counter illustrated in FIG. 11 fails to exceed 6 percent.

As noted above, this increased responsiveness may be explained by the fact that in contrast to the RX_U_WITH-OUT_C counter proposed herein, the conventional early and late counters fail to increment when a U-Plane message is received within its expected reception window, but without having received corresponding control information. Further, the RX_U_WITHOUT_C counter may account for the fact that a single C-Plane message may have multiple corre-sponding U-Plane messages (e.g., the counter may incre-ment for each of the U-Plane messages). In other words, C-Plane messages corresponding to U-Plane messages hav-ing multiplicities greater than 1 (e.g., 1 C-Plane message corresponds to 3 U-Plane messages) impacts the growth of the RX_U_WITHOUT_C counter value. When 1 C-Plane message corresponds to several U-Plane messages (e.g., during peak load scenarios), conventional early and late U-Plane drop counters grow linearly compared to the expo-nential growth observed in the RX_U_WITHOUT_C coun-ter, as illustrated in FIG. 12.

Thus, a value of the RX_U_WITHOUT_C counter may reach a threshold more rapidly than the conventional early/ late counters. As a result, use of the RX_U_WITHOUT_C counter proposed herein may result in a DU taking correc-tive action sooner (e.g., adjusting C-Plane transmission timing), which may result in improved spectral efficiency, latency, performance, and user experience.

Figure 13:
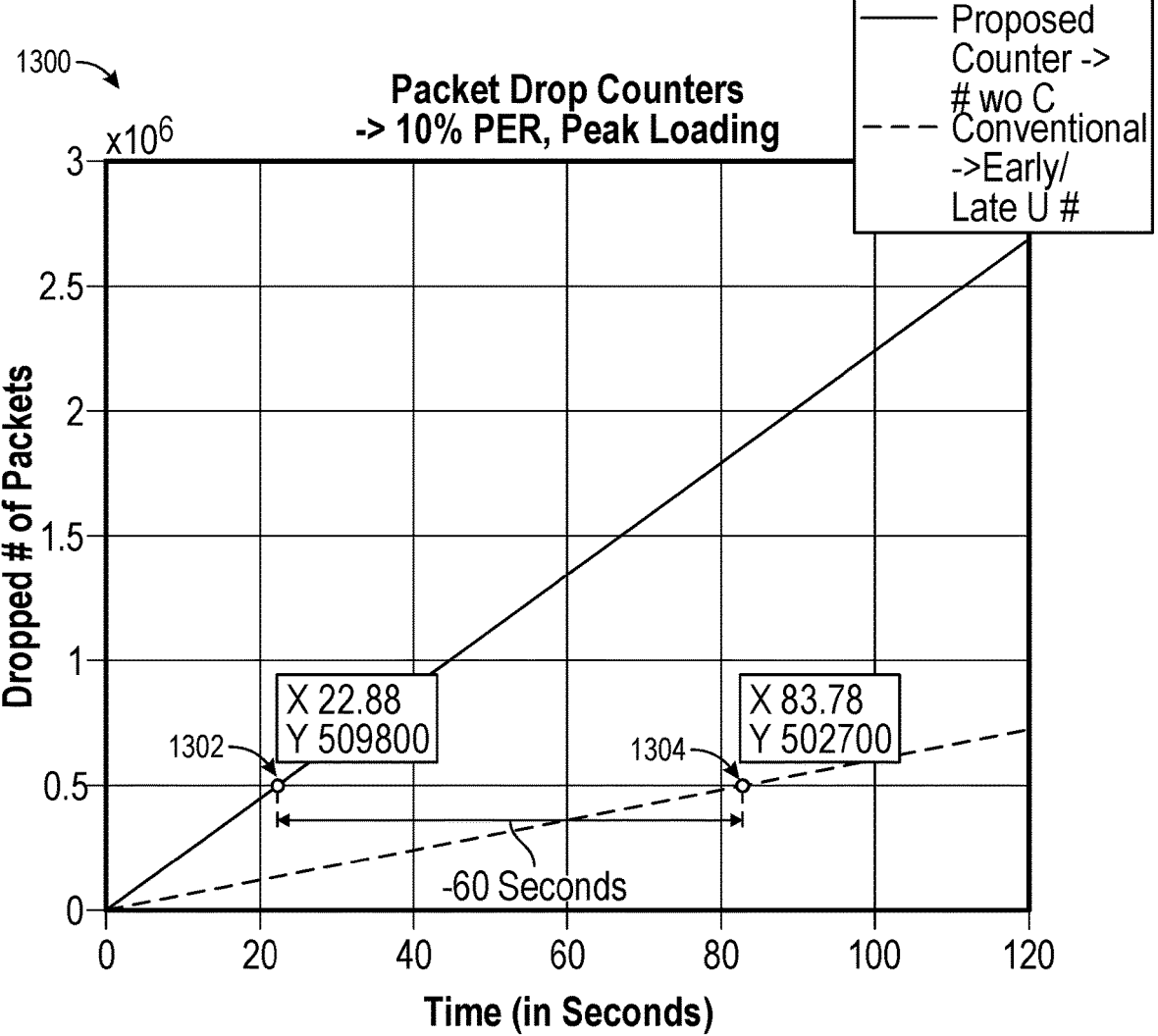
FIG. 13 depicts an example graph illustrating example numbers of dropped packets, with and without implementing the counter proposed herein.

FIG. 13 depicts an example graph illustrating simulated values of the conventional early/late counters compared to the counter proposed herein. The illustrated example assumes a threshold of 500,000 ($0.5 \times 10^6$) dropped packets.

As illustrated in FIG. 13, the counter proposed herein (e.g., RX_U_WITHOUT_C) may reach the given (e.g., preconfigured or dynamically determined/indicated) thresh-old (e.g., of instances of receiving U-Plane message without a corresponding C-Plane message) significantly faster than a conventional early late counter (e.g., resulting in faster C-Plane transmission timing adjustment to correct problems that result in dropped U-Plane messages).

In the illustrated example, the RX_U_WITHOUT_C counter reaches the example threshold (of $0.5 \times 10^6$ dropped packets), at 1302, approximately 60 seconds sooner than the conventional early/late counters, at 1304. The example assumes the RX_U_WITHOUT_C counter has reached 509, 800 at 22.88s (e.g., corresponding to a statistics request time stamp), while the conventional counters do not reach the threshold until much later (502,700 at 83.78 seconds).

As noted above, once the threshold is reached, C-Plane transmission timing correction may be triggered. Thus, the 60 second difference may represent a significantly expedited response time for correcting C-Plane transmission timing when using the counter proposed herein. Such an improve-ment in C-Plane transmission timing correction may lead to significant improvements of spectral efficiency, latency, per-formance, and user experience.

Example Network Entity Operations

Figure 14:
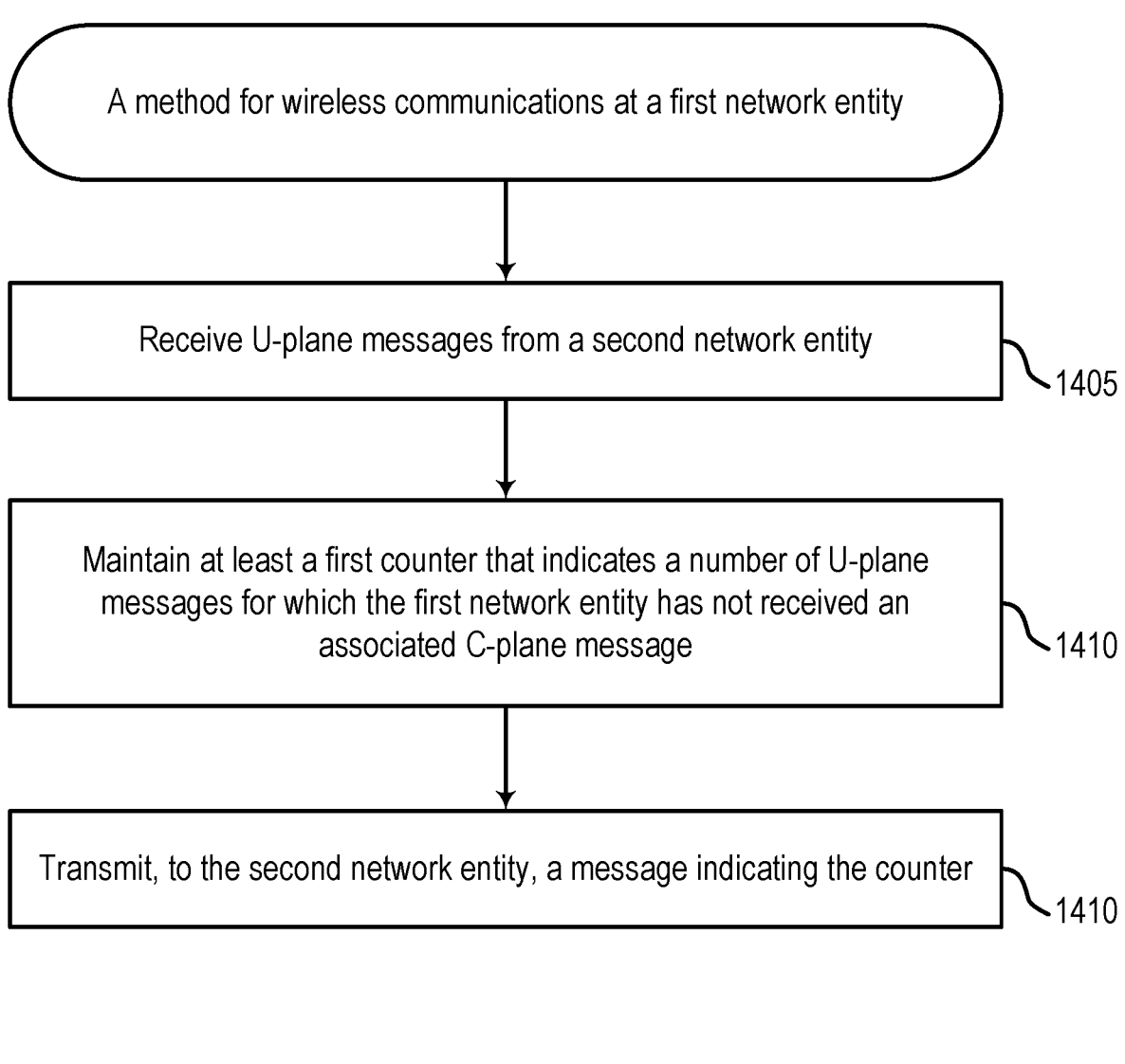
FIG. 14 depicts a method for wireless communications.

FIG. 14 shows an example of a method 1400 of wireless communication at a first network entity, such as a BS 102 of FIGS. 1 and 3, or a disaggregated base station as discussed with respect to FIG. 2.

Method 1400 begins at step 1405 with receiving U-Plane messages from a second network entity. In some cases, the operations of this step refer to, or may be performed by, circuitry for receiving and/or code for receiving as described with reference to FIG. 16.

Method 1400 then proceeds to step 1410 with maintaining at least a first counter that indicates a number of U-Plane messages for which the first network entity has not received an associated C-Plane message. In some cases, the operations of this step refer to, or may be performed by, circuitry for maintaining and/or code for maintaining as described with reference to FIG. 16.

Method 1400 then proceeds to step 1415 with transmitting, to the second network entity, a message indicating the counter. In some cases, the operations of this step refer to, or may be performed by, circuitry for transmitting and/or code for transmitting as described with reference to FIG. 16.

In some aspects, the method 1400 further includes receiving a statistics collection request from the second network entity, wherein the message is transmitted based on the statistics collection request. In some cases, the operations of this step refer to, or may be performed by, circuitry for receiving and/or code for receiving as described with reference to FIG. 16.

In some aspects, maintaining at least the first counter comprises incrementing a value of the first counter based on a determination that a C-Plane message associated with a U-Plane message has not been received within a reception window.

In some aspects, the method 1400 further includes discarding the U-Plane message based on the determination. In some cases, the operations of this step refer to, or may be performed by, circuitry for discarding and/or code for discarding as described with reference to FIG. 16.

In some aspects, the at least the first counter is associated with a first antenna.

In some aspects, the method 1400 further includes maintaining at least a second counter, associated with at least a second antenna, that indicates U-Plane messages for which the first network entity has not received an associated C-Plane message transmitted via the at least the second antenna. In some cases, the operations of this step refer to, or may be performed by, circuitry for receiving and/or code for receiving as described with reference to FIG. 16.

In some aspects: the first network entity comprises a RU; and the second network entity comprises a DU.

In some aspects, the transmitting the message is based on the counter exceeding a threshold value.

In some aspects, the method 1400 further includes receiving signaling from the second network entity indicating the threshold value. In some cases, the operations of this step refer to, or may be performed by, circuitry for receiving and/or code for receiving as described with reference to FIG. 16.

In one aspect, method 1400, or any aspect related to it, may be performed by an apparatus, such as communications device 1600 of FIG. 16, which includes various components operable, configured, or adapted to perform the method 1400.

Communications device 1600 is described below in further detail.

Note that FIG. 14 is just one example of a method, and other methods including fewer, additional, or alternative steps are possible consistent with this disclosure.

FIG. 15 shows an example of a method 1500 of wireless communication at a second network entity, such as a BS 102 of FIGS. 1 and 3, or a disaggregated base station as discussed with respect to FIG. 2.

Method 1500 begins at step 1505 with transmitting, to a first network entity, U-Plane messages. In some cases, the operations of this step refer to, or may be performed by, circuitry for transmitting and/or code for transmitting as described with reference to FIG. 16.

Method 1500 then proceeds to step 1510 with receiving, from the first network entity, a message indicating a number of U-Plane messages for which the first network entity has not received an associated C-Plane message. In some cases, the operations of this step refer to, or may be performed by, circuitry for receiving and/or code for receiving as described with reference to FIG. 16.

Method 1500 then proceeds to step 1515 with adjusting C-Plane message transmission timing based on the indicated number. In some cases, the operations of this step refer to, or may be performed by, circuitry for adjusting and/or code for adjusting as described with reference to FIG. 16.

In some aspects, the method 1500 further includes determining that the indicated number exceeds a threshold value, wherein the C-Plane message transmission timing is adjusted based on the determination. In some cases, the operations of this step refer to, or may be performed by, circuitry for determining and/or code for determining as described with reference to FIG. 16.

In some aspects, the method 1500 further includes adjusting the threshold value. In some cases, the operations of this step refer to, or may be performed by, circuitry for adjusting and/or code for adjusting as described with reference to FIG. 16.

In some aspects, the method 1500 further includes transmitting a statistics collection request to the first network entity, wherein the message is received based on the statistics collection request. In some cases, the operations of this step refer to, or may be performed by, circuitry for transmitting and/or code for transmitting as described with reference to FIG. 16.

In some aspects, the message indicates the number of U-Plane messages for which the first network entity has not received an associated C-Plane message within a reception window.

In some aspects: the first network entity comprises a RU; and the second network entity comprises a DU.

In some aspects, the method 1500 further includes configuring the first network entity to transmit the message when the first network entity determines that the number of U-Plane messages for which the first network entity has not received an associated C-Plane message exceeds a threshold value. In some cases, the operations of this step refer to, or may be performed by, circuitry for configuring and/or code for configuring as described with reference to FIG. 16.

In some aspects, the configuring comprising transmitting, to the first network entity, an indication of the threshold value.

In one aspect, method 1500, or any aspect related to it, may be performed by an apparatus, such as communications device 1600 of FIG. 16, which includes various components operable, configured, or adapted to perform the method 1500. Communications device 1600 is described below in further detail.

Note that FIG. 15 is just one example of a method, and other methods including fewer, additional, or alternative steps are possible consistent with this disclosure.

Example Communications Device

FIG. 16 depicts aspects of an example communications device 1600. In some aspects, communications device 1600 is a network entity, such as BS 102 of FIGS. 1 and 3, or a disaggregated base station as discussed with respect to FIG. 2.

The communications device 1600 includes a processing system 1602 coupled to the transceiver 1638 (e.g., a transmitter and/or a receiver) and/or a network interface 1642. The transceiver 1638 is configured to transmit and receive signals for the communications device 1600 via the antenna 1640, such as the various signals as described herein. The network interface 1642 is configured to obtain and send signals for the communications device 1600 via communication link(s), such as a backhaul link, midhaul link, and/or fronthaul link as described herein, such as with respect to FIG. 2. The processing system 1602 may be configured to perform processing functions for the communications device 1600, including processing signals received and/or to be transmitted by the communications device 1600.

The processing system 1602 includes one or more processors 1604. In various aspects, one or more processors 1604 may be representative of one or more of receive processor 338, transmit processor 320, TX MIMO processor 330, and/or controller/processor 340, as described with respect to FIG. 3. The one or more processors 1604 are coupled to a computer-readable medium/memory 1620 via a bus 1636. In certain aspects, the computer-readable medium/memory 1620 is configured to store instructions (e.g., computer-executable code) that when executed by the one or more processors 1604, cause the one or more processors 1604 to perform the method 1400 described with respect to FIG. 14, or any aspect related to it; and the method 1500 described with respect to FIG. 15, or any aspect related to it. Note that reference to a processor of communications device 1600 performing a function may include one or more processors 1604 of communications device 1600 performing that function.

In the depicted example, the computer-readable medium/memory 1620 stores code (e.g., executable instructions), such as code for receiving 1622, code for maintaining 1624, code for transmitting 1626, code for discarding 1628, code for adjusting 1630, code for determining 1632, and code for configuring 1634. Processing of the code for receiving 1622, code for maintaining 1624, code for transmitting 1626, code for discarding 1628, code for adjusting 1630, code for determining 1632, and code for configuring 1634 may cause the communications device 1600 to perform the method 1400 described with respect to FIG. 14, or any aspect related to it; and the method 1500 described with respect to FIG. 15, or any aspect related to it.

The one or more processors 1604 include circuitry configured to implement (e.g., execute) the code stored in the computer-readable medium/memory 1620, including circuitry such as circuitry for receiving 1606, circuitry for maintaining 1608, circuitry for transmitting 1610, circuitry for discarding 1612, circuitry for adjusting 1614, circuitry for determining 1616, and circuitry for configuring 1618. Processing with circuitry for receiving 1606, circuitry for maintaining 1608, circuitry for transmitting 1610, circuitry for discarding 1612, circuitry for adjusting 1614, circuitry for determining 1616, and circuitry for configuring 1618 may cause the communications device 1600 to perform the method 1400 described with respect to FIG. 14, or any aspect related to it; and the method 1500 described with respect to FIG. 15, or any aspect related to it.

Various components of the communications device 1600 may provide means for performing the method 1400 described with respect to FIG. 14, or any aspect related to it; and the method 1500 described with respect to FIG. 15, or any aspect related to it. Means for transmitting, sending or outputting for transmission may include transceivers 332 and/or antenna(s) 334 of the BS 102 illustrated in FIG. 3 and/or the transceiver 1638 and the antenna 1640 of the communications device 1600 in FIG. 16. Means for receiving or obtaining may include transceivers 332 and/or antenna(s) 334 of the BS 102 illustrated in FIG. 3 and/or the transceiver 1638 and the antenna 1640 of the communications device 1600 in FIG. 16.

Example Clauses

Implementation examples are described in the following numbered clauses:

Clause 1: A method for wireless communications at a first network entity, comprising: receiving U-Plane messages from a second network entity; maintaining at least a first counter that indicates a number of U-Plane messages for which the first network entity has not received an associated C-Plane message; and transmitting, to the second network entity, a message indicating the counter.

Clause 2: The method of Clause 1, further comprising: receiving a statistics collection request from the second network entity, wherein the message is transmitted based on the statistics collection request.

Clause 3: The method of any one of Clauses 1 and 2, wherein maintaining at least the first counter comprises incrementing a value of the first counter based on a determination that a C-Plane message associated with a U-Plane message has not been received within a reception window.

Clause 4: The method of Clause 3, further comprising: discarding the U-Plane message based on the determination.

Clause 5: The method of any one of Clauses 1-4, wherein: the at least the first counter is associated with a first antenna; and the method further comprises maintaining at least a second counter, associated with at least a second antenna, that indicates U-Plane messages for which the first network entity has not received an associated C-Plane message transmitted via the at least the second antenna.

Clause 6: The method of any one of Clauses 1-5, wherein: the first network entity comprises a RU; and the second network entity comprises a DU.

Clause 7: The method of any one of Clauses 1-6, wherein the transmitting the message is based on the counter exceeding a threshold value.

Clause 8: The method of Clause 7, further comprising: receiving signaling from the second network entity indicating the threshold value.

Clause 9: A method for wireless communications at a second network entity, comprising: transmitting, to a first network entity, U-Plane messages; receiving, from the first network entity, a message indicating a number of U-Plane messages for which the first network entity has not received an associated C-Plane message; and adjusting C-Plane message transmission timing based on the indicated number.

Clause 10: The method of Clause 9, further comprising: determining that the indicated number exceeds a threshold value, wherein the C-Plane message transmission timing is adjusted based on the determination.

Clause 11: The method of Clause 10, further comprising: adjusting the threshold value.

Clause 12: The method of any one of Clauses 9-11, further comprising: transmitting a statistics collection request to the first network entity, wherein the message is received based on the statistics collection request.

Clause 13: The method of any one of Clauses 9-12, wherein the message indicates the number of U-Plane messages for which the first network entity has not received an associated C-Plane message within a reception window.

Clause 14: The method of any one of Clauses 9-13, wherein: the first network entity comprises a RU; and the second network entity comprises a DU.

Clause 15: The method of any one of Clauses 9-14, further comprising: configuring the first network entity to transmit the message when the first network entity determines that the number of U-Plane messages for which the first network entity has not received an associated C-Plane message exceeds a threshold value.

Clause 16: The method of Clause 15, wherein the configuring comprising transmitting, to the first network entity, an indication of the threshold value.

Clause 17: An apparatus, comprising: a memory comprising executable instructions; and a processor configured to execute the executable instructions and cause the apparatus to perform a method in accordance with any one of Clauses 1-16.

Clause 18: An apparatus, comprising means for performing a method in accordance with any one of Clauses 1-16.

Clause 19: A non-transitory computer-readable medium comprising executable instructions that, when executed by a processor of an apparatus, cause the apparatus to perform a method in accordance with any one of Clauses 1-16.

Clause 20: A computer program product embodied on a computer-readable storage medium comprising code for performing a method in accordance with any one of Clauses 1-16.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communications at a first network entity, comprising:

receiving user plane (U-Plane) messages from a second network entity;

maintaining at least a first counter that indicates a number of U-Plane messages for which the first network entity has not received an associated control plane (C-Plane) message by incrementing a value of the first counter based on a determination that the C-Plane message associated with a U-Plane message of the number of U-Plane message has not been received within a reception window; and transmitting, to the second network entity, a message indicating the first counter.

2. The method of claim 1, further comprising receiving a statistics collection request from the second network entity, wherein the message is transmitted based on the statistics collection request.

3. The method of claim 1, further comprising discarding the U-Plane message based on the determination.

4. The method of claim 1, wherein:

the at least the first counter is associated with a first antenna; and the method further comprises maintaining at least a second counter, associated with at least a second antenna, that indicates U-Plane messages for which the first network entity has not received an associated C-Plane message transmitted via the at least the second antenna.

5. The method of claim 1, wherein:

the first network entity comprises a radio unit (RU); and the second network entity comprises a distributed unit (DU).

6. The method of claim 1, wherein the transmitting the message is based on the first counter exceeding a threshold value.

7. The method of claim 6, further comprising receiving signaling from the second network entity indicating the threshold value.

8. A method for wireless communications at a second network entity, comprising:

transmitting, to a first network entity, user plane (U-Plane) messages;

receiving, from the first network entity, a message indicating a number of U-Plane messages for which the first network entity has not received an associated control plane (C-Plane) message within a reception window; and adjusting C-Plane message transmission timing based on the indicated number.

9. The method of claim 8, further comprising determining that the indicated number exceeds a threshold value, wherein the C-Plane message transmission timing is adjusted based on the determination.

10. The method of claim 9, further comprising adjusting the threshold value.

11. The method of claim 8, further comprising transmitting a statistics collection request to the first network entity, wherein the message is received based on the statistics collection request.

12. The method of claim 8, wherein:

the first network entity comprises a radio unit (RU); and the second network entity comprises a distributed unit (DU).

13. The method of claim 8, further comprising configuring the first network entity to transmit the message when the first network entity determines that the number of U-Plane messages for which the first network entity has not received an associated C-Plane message exceeds a threshold value.

14. The method of claim 13, wherein the configuring comprising transmitting, to the first network entity, an indication of the threshold value.

15. A first network entity configured for wireless communication, comprising: memory comprising processor-executable instructions; and one or more processors configured, individually or collectively, to execute the processor-executable instructions and cause the first network entity to:

receive user plane (U-Plane) messages from a second network entity;

maintain at least a first counter that indicates a number of U-Plane messages for which the first network entity has not received an associated control plane (C-Plane)

message by incrementing a value of the first counter based on a determination that the C-Plane message associated with a U-Plane message of the number of U-Plane message has not been received within a reception window; and transmit, to the second network entity, a message indicating the first counter.

16. The first network entity of claim 15, wherein the one or more processors are further configured, individually or collectively, to execute the processor-executable instructions and cause the first network entity to receive a statistics collection request from the second network entity, wherein the message is transmitted based on the statistics collection request.

17. The first network entity of claim 15, wherein the one or more processors are further configured, individually or collectively, to execute the processor-executable instructions and cause the first network entity to discard the U-Plane message based on the determination.

18. The first network entity of claim 15, wherein:

the at least the first counter is associated with a first antenna; and wherein the one or more processors are further configured, individually or collectively, to execute the processor-executable instructions and cause the first network entity to maintain at least a second counter, associated with at least a second antenna, that indicates U-Plane messages for which the first network entity has not received an associated C-Plane message transmitted via the at least the second antenna.

19. The first network entity of claim 15, wherein:

the first network entity comprises a radio unit (RU); and the second network entity comprises a distributed unit (DU).

20. The first network entity of claim 15, wherein transmitting the message is based on the first counter exceeding a threshold value.

21. A second network entity configured for wireless communication, comprising: memory comprising processor-executable instructions; and one or more processors configured, individually or collectively, to execute the processor-executable instructions and cause the second network entity to:

transmit, to a first network entity, user plane (U-Plane) messages;

receive, from the first network entity, a message indicating a number of U-Plane messages for which the first network entity has not received an associated control plane (C-Plane) message within a reception window; and adjust C-Plane message transmission timing based on the indicated number.

22. The second network entity of claim 21, wherein the one or more processors are further configured, individually or collectively, to execute the processor-executable instructions and cause the first network entity to determine that the indicated number exceeds a threshold value, wherein the C-Plane message transmission timing is adjusted based on the determination.

23. The second network entity of claim 22, wherein the one or more processors are further configured, individually or collectively, to execute the processor-executable instructions and cause the first network entity to adjust the threshold value.

24. The second network entity of claim 21, wherein the one or more processors are further configured, individually or collectively, to execute the processor-executable instructions and cause the first network entity to transmit a statistics collection request to the first network entity, wherein the message is received based on the statistics collection request.

25. The second network entity of claim 21, wherein:

the first network entity comprises a radio unit (RU); and the second network entity comprises a distributed unit (DU).

26. The second network entity of claim 21, wherein the one or more processors are further configured, individually or collectively, to execute the processor-executable instructions and cause the first network entity to configure the first network entity to transmit the message when the first network entity determines that the number of U-Plane messages for which the first network entity has not received an associated C-Plane message exceeds a threshold value.

* * * * *